United States Patent
Sakamoto et al.

(10) Patent No.: US 11,171,821 B2
(45) Date of Patent: Nov. 9, 2021

(54) TRANSMISSION APPARATUS, TRANSMISSION METHOD, RECEPTION APPARATUS, AND RECEPTION METHOD

(71) Applicant: Panasonic Intellectual Property Corporation of America, Torrance, CA (US)

(72) Inventors: Takenori Sakamoto, Kanagawa (JP); Hiroyuki Motozuka, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 5 days.

(21) Appl. No.: 16/708,986

(22) Filed: Dec. 10, 2019

(65) Prior Publication Data

US 2020/0112469 A1 Apr. 9, 2020

Related U.S. Application Data

(63) Continuation of application No. PCT/JP2018/029198, filed on Aug. 3, 2018.

(30) Foreign Application Priority Data

May 23, 2018 (JP) .............................. JP2018-099143

(51) Int. Cl.
*H04L 27/26* (2006.01)
*H04W 80/02* (2009.01)
(Continued)

(52) U.S. Cl.
CPC ....... *H04L 27/2675* (2013.01); *H04B 7/0456* (2013.01); *H04L 1/0026* (2013.01);
(Continued)

(58) Field of Classification Search
CPC .................................................. H04L 27/2675
See application file for complete search history.

(56) References Cited

U.S. PATENT DOCUMENTS

| | | | |
|---|---|---|---|
| 2008/0049654 A1* | 2/2008 | Otal | H04W 28/06 370/311 |
| 2014/0126509 A1* | 5/2014 | You | H04B 7/0697 370/329 |

(Continued)

FOREIGN PATENT DOCUMENTS

| | | |
|---|---|---|
| WO | 2005/112355 A1 | 11/2005 |
| WO | 2013/165582 A1 | 11/2013 |
| WO | 2016/194298 A1 | 12/2016 |

OTHER PUBLICATIONS

International Search Report of PCT application No. PCT/JP2018/029198 dated Oct. 23, 2018.
(Continued)

*Primary Examiner* — Jason E Mattis
(74) *Attorney, Agent, or Firm* — Seed IP Law Group LLP

(57) ABSTRACT

A transmission apparatus includes a generation circuit that generates a transmission signal in which a plurality of protocol data units in a physical layer are aggregated, an insertion circuit that inserts a preamble into each of a first protocol data unit and a second protocol data unit, where the preamble is used for at least one of synchronization of a transmission channel and estimation of the transmission channel, and a transmission circuit that performs spatial processing on the transmission signal with the preamble inserted and transmits the transmission signal.

11 Claims, 9 Drawing Sheets

Related U.S. Application Data

(60) Provisional application No. 62/554,927, filed on Sep. 6, 2017.

(51) Int. Cl.
  *H04W 28/06* (2009.01)
  *H04B 7/0456* (2017.01)
  *H04L 1/00* (2006.01)
  *H04L 5/00* (2006.01)

(52) U.S. Cl.
  CPC ........ *H04L 5/0048* (2013.01); *H04L 27/2607* (2013.01); *H04W 28/06* (2013.01); *H04W 80/02* (2013.01)

(56) References Cited

U.S. PATENT DOCUMENTS

| | | | |
|---|---|---|---|
| 2016/0066338 A1* | 3/2016 | Kwon | H04L 5/0091 370/330 |
| 2016/0119811 A1* | 4/2016 | Merlin | H04L 5/0055 370/329 |
| 2018/0048509 A1 | 2/2018 | Huang et al. | |
| 2019/0150063 A1* | 5/2019 | Chu | H04W 48/12 370/338 |
| 2020/0178120 A1* | 6/2020 | Sugaya | H04W 28/06 |

OTHER PUBLICATIONS

IEEE Std 802.11(TM)—2016, IEEE Standard for Information technology—Telecommunications and information exchange between systems, Local and metropolitan area networks—Specific requirements Part 11: Wireless LAN Medium Access Control (MAC) and Physical Layer (PHY) Specifications, Dec. 14, 2016.

IEEE 802.11-16/1623r0, "6.3.2.2 EDMG A-PPDU format", Dec. 21, 2016.

IEEE 802.11-17/0051r3, "EDMG A-PPDU for 11ay SC mode", Jan. 17, 2017.

IEEE 802.11-17/0761r4, "Comment Resolution on EDMG A-PPDU Structure", May 10, 2017.

Il-Gu Lee et al., "Robust Wireless Transmission Utilizing PPDU-Based Aggregation Technique for Next Generation Wireless LANs", IEEE Communications Letters, vol. 14, No. 3, Mar. 8, 2010, pp. 205-207.

IEEE 802.11-16/0061-00-00, "PHY Frame Format proposal for 11ay", Jan. 18, 2016.

IEEE 802.11-17/0051r0, "EDMG A-PPDU for 11ay SC mode", Jan. 17, 2017.

Otal et al., "Enhancements of 802.11a/g-based MIMO-OFDM System", Philips, San Jose, CA, Aug. 13, 2004, doc.: IEEE 802.11-04/943r0, 36 pages.

The Extended European Search Report dated Sep. 25, 2020 for the related European Patent Application No. 18854854.9, 13 pages.

Wang et al., "Less Transmissions, More Throughput: Bringing Carpool to Public WLANs" IEEE Transactions on Mobile Computing, vol. 15, No. 5, May 2016, pp. 1168-1181, 14 pages.

English Translation of Taiwanese Search Report dated Jul. 23, 2021 for the related Taiwan Patent Application No. 107127463, 1 page.

\* cited by examiner

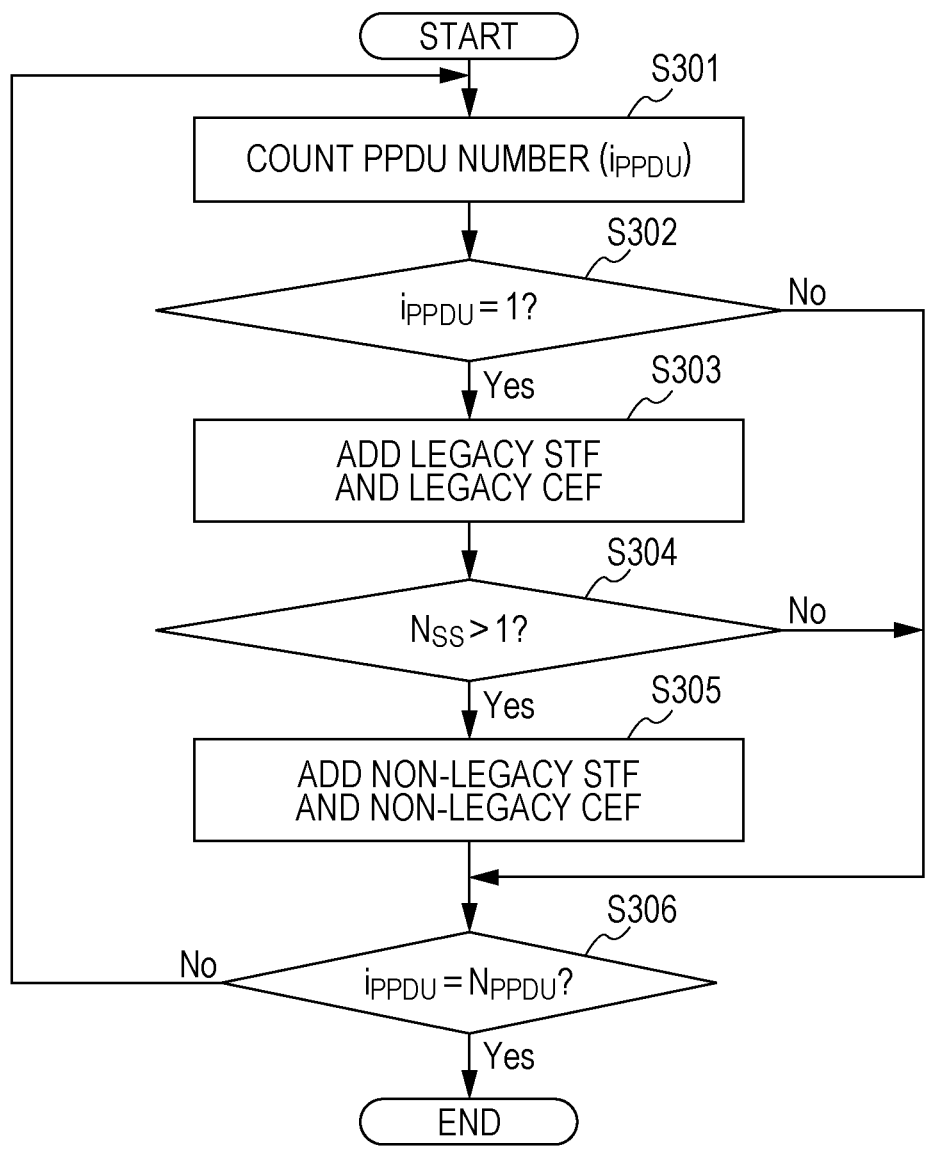

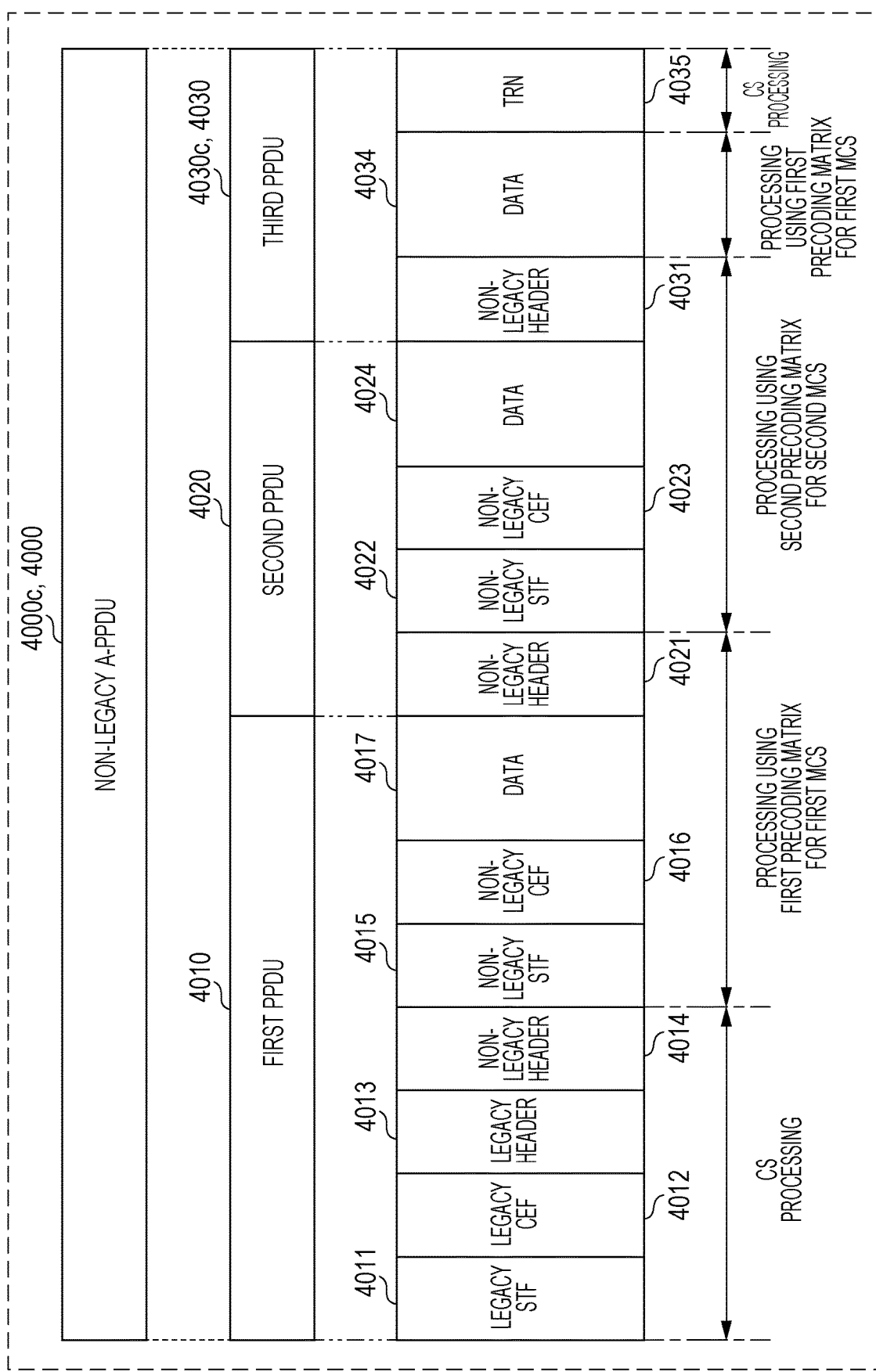

11,171,821 B2

TRANSMISSION APPARATUS, TRANSMISSION METHOD, RECEPTION APPARATUS, AND RECEPTION METHOD

BACKGROUND

1. Technical Field

The present disclosure relates to a transmission apparatus, a transmission method, a reception apparatus, and a reception method.

2. Description of the Related Art

IEEE802.11 is one of wireless LAN related standards and includes, for example, the IEEE802.11ad standard and the IEEE802.11ay standard (refer to, for example, IEEE802.11-2016 (Dec. 14, 2016)). The IEEE 802.11ay standard has been developed as a standard for applying Aggregate-PLCP (Physical Layer Convergence Protocol) Protocol Data Unit (hereinafter referred to as "A-PPDU") technique to millimeter wave communication to achieve high quality data transmission (refer to IEEE802.11-16-1623r0 (Dec. 21, 2016), IEEE802.11-17-0051r3 (Jan. 16, 2017), and IEEE802.11-17-0761r4 (Dec. 21, 2017)).

SUMMARY

One non-limiting and exemplary embodiment provides an improved non-legacy A-PPDU transmission apparatus, transmission method, reception apparatus, and reception method with improved transmission efficiency.

In one general aspect, the techniques disclosed here feature a transmission apparatus including a generation circuit that generates a transmission signal in which a plurality of protocol data units in a physical layer are aggregated, an insertion circuit that inserts a preamble into each of a first protocol data unit and a second protocol data unit among the plurality of protocol data units, where the preamble is used for at least one of synchronization of a transmission channel and estimation of the transmission channel, and a transmission circuit that performs spatial processing on the transmission signal with the preamble inserted and transmits the transmission signal.

According to an aspect of the present disclosure, an improved non-legacy A-PPDU transmission apparatus, transmission method, reception apparatus, and reception method with improved transmission efficiency can be provided.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a flowchart illustrating a preamble insertion procedure;

FIG. 4C is a diagram illustrating an example of a non-legacy A-PPDU format according to the present disclosure;

DETAILED DESCRIPTION

A variety of embodiments of the present disclosure are described in detail below with reference to the accompanying drawings. For the sake of clarity and brevity, the description below does not include detailed descriptions of widely known functions and configurations incorporated into the present specification.

To maintain backward compatibility with legacy apparatuses that conform to the IEEE 802.11ad standard, a non-legacy apparatus that conforms to the IEEE 802.11ay standard needs to support both a SISO (Single-Input and Single-Output) method defined in the IEEE802.11ad and a MIMO (Multiple-Input and Multiple-Output) method added to the IEEE802.11ay. For this reason, even an NG60 WiGig (a non-legacy WiGig) apparatus is required to define the A-PPDU (non-legacy A-PPDU) format and transmission method that support the MIMO method. A non-legacy A-PPDU 1000 is described first with reference to FIGS. 1 to 3.

Figure 1:
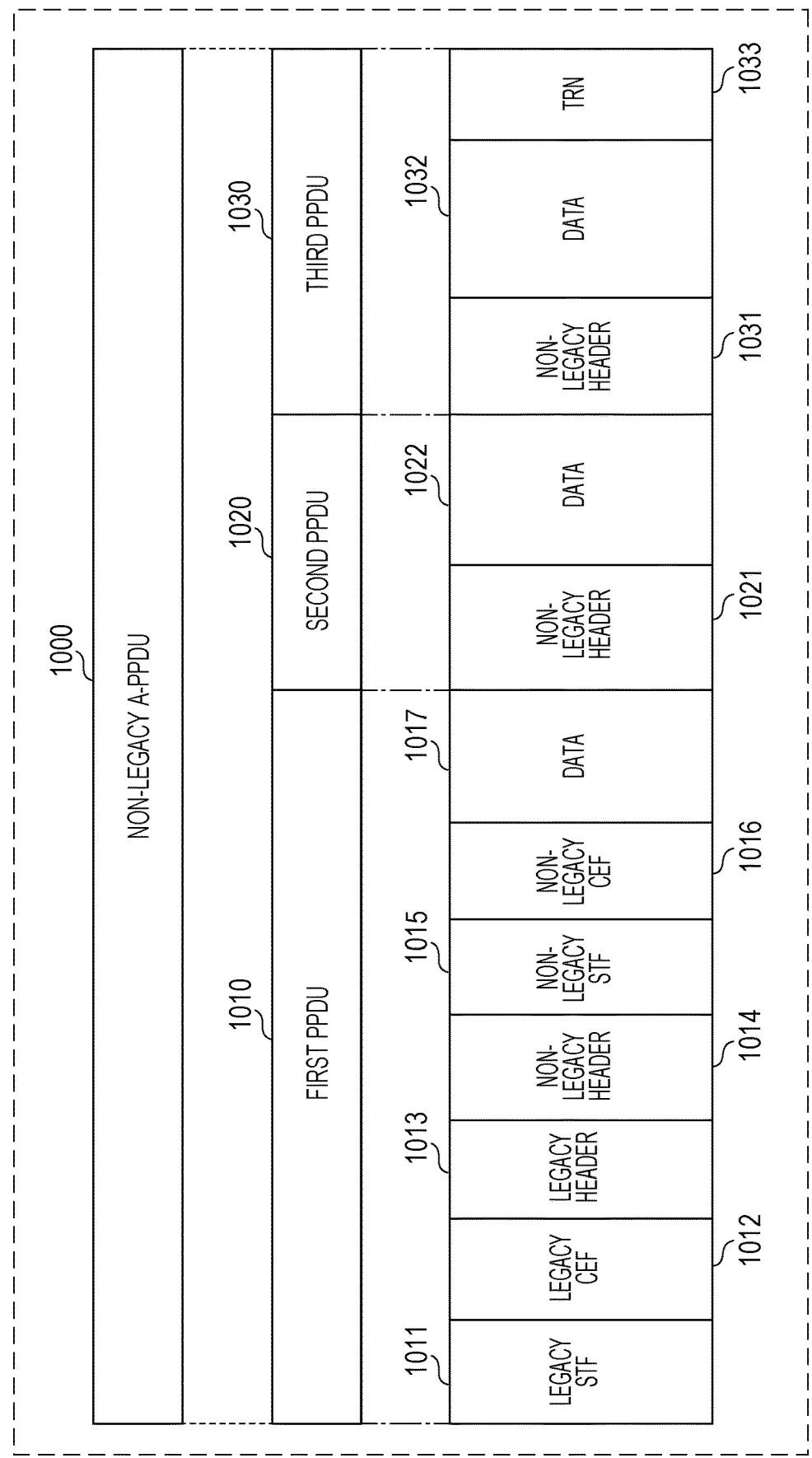
FIG. 1 is a diagram illustrating an example of a non-legacy A-PPDU format.

FIG. 1 is a diagram illustrating an example of the format of a non-legacy A-PPDU 1000.

In the non-legacy A-PPDU 1000, $N_{PPDU}$ PPDUs are aggregated. Note that $N_{PPDU}$ represents the number of PPDUs aggregated into the non-legacy A-PPDU 1000 (hereinafter referred to as the "number of aggregated PPDUs"), and $N_{PPDU}$ is an integer greater than or equal to 2. Hereinafter, for the sake of clarity and brevity, the format of the non-legacy A-PPDU 1000 is described with reference to an example illustrated in FIG. 1, in which $N_{PPDU}$ is 3. However, the $N_{PPDU}$ may be 2 or an integer number greater than or equal to 4.

The non-legacy A-PPDU 1000 includes a first PPDU 1010, a second PPDU 1020, and a third PPDU 1030.

The first PPDU 1010 includes a legacy STF (Short Training Field) 1011, a legacy CEF (Channel Estimation Field) 1012, a legacy header field 1013, a non-legacy header field 1014, a non-legacy STF 1015, a non-legacy CEF 1016, and a data field 1017.

The second PPDU 1020 includes a non-legacy header field 1021 and a data field 1022.

The third PPDU 1030 includes a non-legacy header field 1031, a data field 1032, and a TRN (Training) field 1033.

The legacy STF 1011 is a field including information used for packet detection, AGC (Automatic Gain Control), frequency offset estimation, and synchronization.

The legacy CEF 1012 is a field including information used for channel estimation.

The legacy header field 1013 is a field including, for example, information regarding the transmission period of the non-legacy A-PPDU 1000 and the presence/absence of the non-legacy header fields 1014, 1021, and 1031.

The non-legacy header fields 1014, 1021, and 1031 are fields including information regarding the data fields 1017, 1022, and 1032, respectively. For example, each of the non-legacy header fields 1014, 1021, and 1031 includes a number of spatial streams field and a non-legacy MCS (Modulation and Coding Scheme) field.

Here, the number of spatial streams field is a field indicating the number of MIMO streams $N_{SS}$ used in the data fields 1017, 1022, and 1032. In addition, the non-legacy MCS field is a field indicating a code rate and a data modulation scheme used in each of streams.

In the non-legacy A-PPDU 1000, the MCS of each stream of each of the PPDUs can be changed by referring to the values in the non-legacy header fields 1014, 1021, and 1031. By changing the MCS, high quality data transmission is achieved.

The non-legacy STF 1015 is a field including information used for AGC re-adjustment and resynchronization. The non-legacy STF 1015 is inserted into the first PPDU 1010 when the non-legacy A-PPDU 1000 is transmitted by the channel bonding method and the MIMO method.

Non-legacy CEF 1016 is a field including information used for channel re-estimation. The non-legacy CEF 1016 is inserted into the first PPDU 1010 when the non-legacy A-PPDU 1000 is transmitted by the channel bonding method and the MIMO method.

The data fields 1017, 1022, and 1032 are fields including payload data of the first PPDU 1010, the second PPDU 1020, and the third PPDU 1030, respectively.

The TRN field 1033 is a field including information used for fine beam adjustment or tracking control. The presence/absence of the TRN field 1033 is indicated by a non-legacy header field 1031. The TRN field 1033 is inserted into the last PPDU (the third PPDU 1030 in FIG. 1) that is aggregated into the non-legacy A-PPDU 1000.

Figure 2:
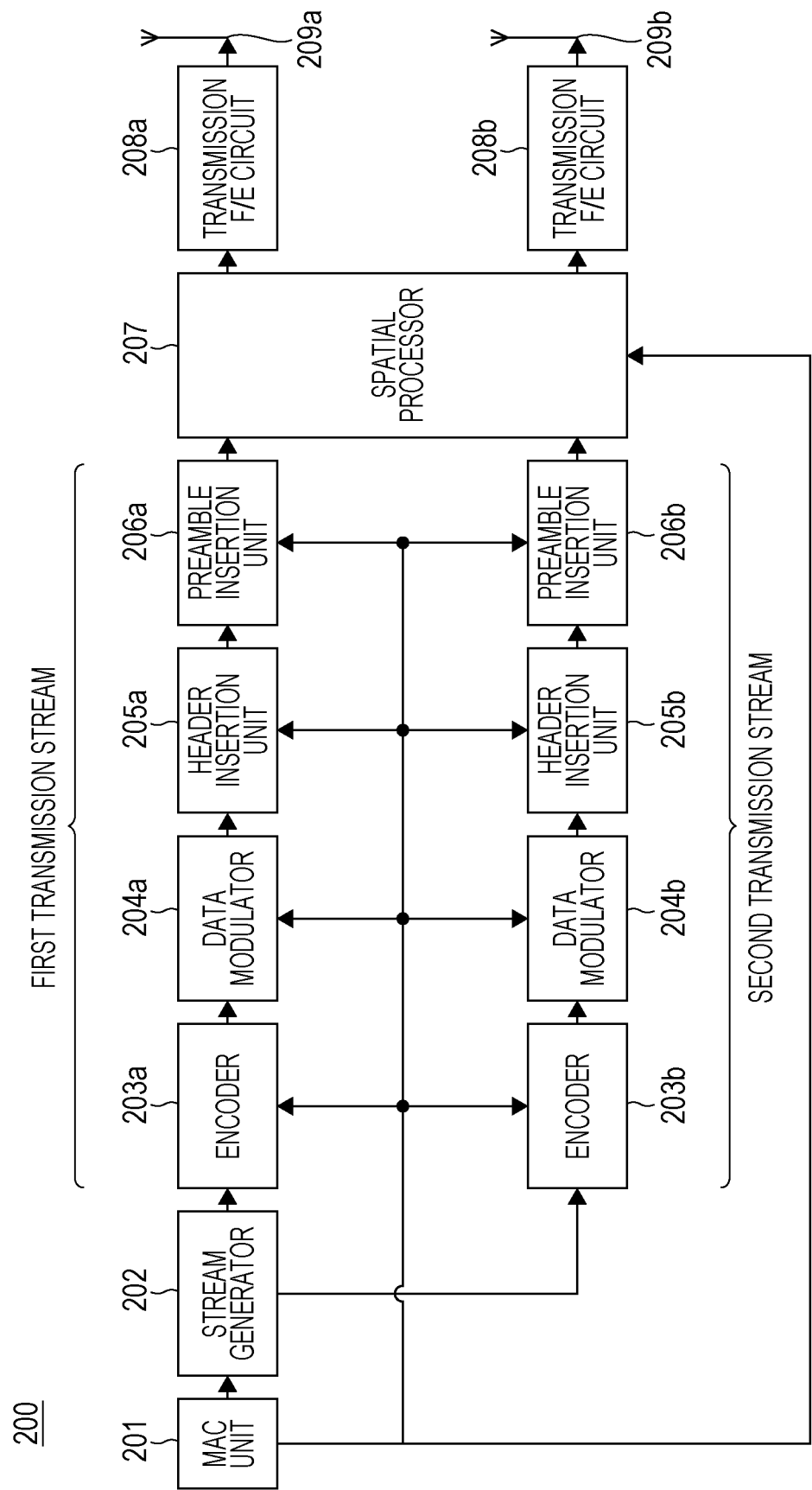
FIG. 2 is a diagram illustrating an example of the configuration of a transmission apparatus.

FIG. 2 is a diagram illustrating an example of the configuration of the transmission apparatus 200 that supports the non-legacy A-PPDU scheme.

The transmission apparatus 200 includes a MAC (Medium Access Control) unit (a MAC circuit) 201, a stream generator (a stream generation circuit) 202, encoders (encoding circuits) 203a and 203b, data modulators (data modulation circuits) 204a and 204b, header insertion units (header insertion circuits) 205a and 205b, preamble insertion units (preamble insertion circuits) 206a and 206b, a spatial processor (a spatial processing circuit) 207, and transmission F/E (front end) circuits 208a and 208b, and transmitting antennas 209a and 209b. Note that in the following description, the notation "XYZ unit" used for a constituent element of the transmission apparatus 200 may be replaced by another notation, such as "XYZ circuit (circuitry)", "XYZ apparatus", or "XYZ module".

The MAC unit 201 generates transmission data and outputs the transmission data to the stream generator 202. In addition, the MAC unit 201 determines the transmission data size, the number of MIMO streams, the code rate of each stream, the codeword size of each stream, and the modulation scheme of each stream for each of the PPDUs aggregated into a non-legacy A-PPDU and sends the determined information to the stream generator 202, the encoders 203a and 203b, the data modulators 204a and 204b, the header insertion units 205a and 205b, the preamble insertion units 206a and 206b, and the spatial processor 207.

The stream generator 202 performs bit scrambling on the transmission data input from the MAC unit 201. Subsequently, the stream generator 202 divides the bit-scrambled transmission data into first transmission stream data and second transmission stream data and outputs the first transmission stream data and second transmission stream data to the encoders 203a and 203b, respectively. Furthermore, the stream generator 202 generates padding bits and performs bit scrambling.

Note that the padding bits are data padding bits and block padding bits. Subsequently, the stream generator 202 divides the bit-scrambled padding bits into a first transmission stream and a second transmission stream.

Subsequently, the stream generator 202 adds, to the first transmission stream data, the padding bits that have been subjected to bit scrambling and divided into the first transmission stream and outputs the first transmission stream data to the encoder 203a. Similarly, the stream generator 202 adds, to the second transmission stream data, the padding bits that have been subjected to bit scrambling and divided into the second transmission stream and outputs the second transmission stream data to the encoder 203b.

The encoder 203a encodes the first transmission stream data input from the stream generator 202 and the data padding bits added to the first transmission stream data to generate first encoded bit data. In encoding, for example, an error correction code, such as an LDPC (Low Density Parity Check) code, is used. Subsequently, the encoder 203a outputs the first encoded bit data to the data modulator 204a.

Similarly, the encoder 203b encodes the second transmission stream data input from the stream generator 202 and the data padding bits added to the second transmission stream data to generate the second encoded bit data. Subsequently, the encoder 203b outputs the second encoded bit data to the data modulator 204b.

In one example, the encoders 203a and 203b output the bit-scrambled block padding bits to the data modulators 204a and 204b, respectively, without encoding the block padding bits. In another example, the encoders 203a and 203b encode the bit-scrambled block padding bits and output the encoded block padding bits to the data modulators 204a and 204b, respectively.

The data modulator 204a performs data modulation on the first encoded bit data and the bit-scrambled block padding bits input from the encoder 203a and generates a transmission data symbol. In data modulation, for example, the following modulation scheme is used: $\pi/2$ shift BPSK (Binary Phase Shift Keying) modulation, $\pi/2$ shift QPSK (Quadrature Phase Shift Keying) modulation, $\pi/2$ shift 16 QAM modulation (16 points Quadrature Amplitude Modulation), $\pi/2$ shift 64 QAM modulation (64-point Quadrature Amplitude Modulation), or $\pi/2$ shift 64 NUC (64-point Non-Uniform Constellation) modulation. Subsequently, the data modulator 204a outputs the generated transmission data symbol to the header insertion unit 205a.

Similarly, the data modulator 204b performs data modulation on the second encoded bit data and the bit-scrambled block padding bits input from the encoder 203b and generates a transmission data symbol. Subsequently, the data modulator 204b outputs the generated transmission data symbol to the header insertion unit 205b.

The header insertion units 205a and 205b generate headers on the basis of the information sent from the MAC unit 201. Note that the headers are a legacy header and a non-legacy header.

Subsequently, the header insertion unit 205a performs data modulation on the headers to generate header symbols. Note that the header symbols are a legacy header symbol and non-legacy header symbols, which are stored in, for example, the legacy header field 1013 and the non-legacy header fields 1014, 1021, and 1031 illustrated in FIG. 1, respectively. As the data modulation scheme, for example, π/2 shift BPSK or QPSK is used. Subsequently, in the same manner, the header insertion unit 205b performs data modulation on the headers and generates header symbols.

Furthermore, the header insertion unit 205a adds the generated header symbols to the transmission data symbol input from the data modulator 204a. For example, as illustrated in FIG. 1, the legacy header symbol and non-legacy header symbols are added to the legacy header field 1013 and the non-legacy header fields 1014, 1021, 1031 in the order illustrated in FIG. 1. Similarly, the header insertion unit 205b adds the generated header symbols to the transmission data symbol input from the data modulator 204b.

In one example, as illustrated in FIG. 1, the header insertion units 205a and 205b add the legacy header symbol to be stored in the legacy header field 1013 to the transmission data symbol to be stored in the transmission data field 1017 of the first PPDU 1010 located in the first position. In contrast, the header insertion units 205a and 205b do not add the legacy header symbol to the transmission data symbols to be stored in the transmission data fields 1022 and 1032 of the second PPDU 1020 and the third PPDU 1030, respectively, which are located in the second and the subsequent positions.

In addition, the header insertion units 205a and 205b add a non-legacy header symbol to each of all the PPDUs (for example, in FIG. 1, a non-legacy header symbol is stored in each of the non-legacy header fields 1014, 1021, and 1031 of the first PPDU 1010, the second PPDU 1020, and the third PPDU 1030, respectively).

Subsequently, the header insertion unit 205a outputs, to the preamble insertion unit 206a, the transmission data symbol with or without the header symbol added thereto. Similarly, the header insertion unit 205b outputs, to the preamble insertion unit 206b, the transmission data symbol with or without the header symbol added thereto.

The preamble insertion unit 206a adds a preamble to the transmission data symbol input from the header insertion unit 205a (the transmission data symbol with or without the header symbol added thereto). As used herein, the term "preamble" is referred to as a value to be stored in each of the legacy STF 1011, the legacy CEF 1012, the non-legacy STF 1015, and the non-legacy CEF 1016. For example, the preambles are added to the legacy STF 1011, the legacy CEF 1012, the non-legacy STF 1015, and the non-legacy CEF 1016 illustrated in FIG. 1 in this order. Similarly, the preamble insertion unit 206b adds a preamble to the transmission data symbol input from the header insertion unit 205b (the transmission data symbol with or without the header symbol added thereto).

In one example, as illustrated in FIG. 1, the preamble insertion units 206a and 206b add, to the transmission data field 1017 of the first PPDU 1010 located in the first position, the legacy STF 1011, the legacy CEF 1012, the non-legacy STF 1015, and the non-legacy CEF 1016 and store the preambles. However, the preamble insertion units 206a and 206b do not add, to the transmission data fields 1022 and 1032 of the second PPDU 1020 and the third PPDU 1030, respectively, located at the second and the subsequent positions, a legacy STF, a legacy CEF, a non-legacy STF, and a non-legacy CEF.

Subsequently, the preamble insertion units 206a and 206b output, to the spatial processor 207, the transmission data symbols with or without the preamble added thereto.

The spatial processor 207 performs spatial processing on the transmission data symbols input from the preamble insertion units 206a and 206b (the transmission data symbols with or without the preamble added thereto) and generates spatially processed signals. In this case, the spatial processing is at least one of CSD (Cyclic Shift Diversity) processing and spatial multiplexing processing by matrix operation using a precoding matrix. In the spatial processing, one of the CSD processing and spatial multiplexing processing is performed on each of the fields of the preamble, header, and transmission data.

For example, the spatial processor 207 performs CSD processing on the legacy STF 1011, legacy CEF 1012, legacy header field 1013, and non-legacy header field 1014 of the first PPDU 1010 and the TRN field 1033 of the third PPDU 1030.

Furthermore, for example, the spatial processor 207 performs, as spatial processing, spatial multiplexing processing by matrix operation using a precoding matrix on the non-legacy STF 1015, the non-legacy CEF 1016, and the transmission data field 1017 of the first PPDU 1010, the non-legacy header field 1021 and the transmission data field 1022 of the second PPDU 1020, and the non-legacy header field 1031 and the transmission data field 1032 of the third PPDU 1030. Note that a reception apparatus (not illustrated) may estimate the precoding matrix used in the transmission apparatus 200 by channel estimation using the non-legacy CEF 1016.

In one example, the spatial processor 207 may use eigenmode transmission as spatial multiplexing processing (a spatial multiplexing scheme). Furthermore, in one example, the spatial processor 207 may perform optimal power distribution on the basis of the water filling theorem in order to maximize the channel capacity.

Subsequently, the spatial processor 207 outputs the spatially processed signals to the transmission F/E circuits 208a and 208b.

The transmission F/E circuits 208a and 208b perform filter processing, D/A conversion processing, frequency conversion processing, and power amplification processing on the spatially processed signals input from the spatial processor 207 to generate RF signals. The transmission F/E circuits 208a and 208b include, for example, digital and analog filters, D/A (digital/analog) conversion circuits, and an RF (Radio Frequency) circuit. For example, an RRC (Root Raised Cosine) filter is used as the digital filter. Subsequently, the transmission F/E circuits 208a and 208b output the generated RF signals to the transmitting antennas 209a and 209b, respectively.

The transmitting antennas 209a and 209b transmit the RF signals input from the transmission F/E circuits 208a and 208b in the form of radio signals to a reception apparatus (not illustrated), respectively.

FIG. 3 is a flowchart illustrating an example of the procedure in which the preamble insertion units 206a and 206b add legacy STFs, legacy CEFs, non-legacy STFs, and non-legacy CEFs to transmission data symbols.

In step S301, the preamble insertion units 206a and 206b count a PPDU number $i_{PPDU}$ of a PPDU aggregated into the non-legacy A-PPDU 1000. For example, in the case of the first PPDU (a first PPDU 1010 in FIG. 1), $i_{PPDU}=1$. In the case of the second PPDU (a second PPDU 1020 in FIG. 1), $i_{PPDU}=2$. That is, in the case of the Nth PPDU, $i_{PPDU}=N$, where N is an integer number greater than or equal to 1.

In step S302, the preamble insertion units 206a and 206b determine whether the transmission data symbols input from the header insertion units 205a and 205b (the transmission data symbols with the header added thereto) are to be included in the PPDU in the first position on the basis of the value of $i_{PPDU}$. If $i_{PPDU}=1$ (step S302: Yes), the preamble insertion units 206a and 206b determine that the transmission data symbol is the one to be included in the PPDU in the first position. Then, the processing proceeds to step S303. However, if $i_{PPDU}\neq1$ (step S302: No), the preamble insertion units 206a and 206b determine that the transmission data symbol is not to be included in the PPDU in the first position. Then, step S303, step S304, and step S305 are skipped, and the processing proceeds to step S306.

In step S303, the preamble insertion units 206a and 206b add the legacy STFs and the legacy CEFs to the transmission data symbols input from the header insertion units 205a and 205b (the transmission data symbols each having the header added thereto), respectively.

In step S304, the preamble insertion units 206a and 206b determine whether the non-legacy A-PPDU 1000 is transmitted by the MIMO method on the basis of the number of MIMO streams $N_{SS}$ sent from the MAC unit 201. If $N_{SS}>1$ (step S304: Yes), the preamble insertion units 206a and 206b determine that the non-legacy A-PPDU 1000 is transmitted by the MIMO method, and the processing proceeds to step S305. However, if $N_{SS}=1$ (step S304: No), the preamble insertion units 206a and 206b determine that the non-legacy A-PPDU 1000 is transmitted by the SISO method. Then, step S305 is skipped, and the processing proceeds to step S306.

In step S305, the preamble insertion units 206a and 206b add the non-legacy STFs and the non-legacy CEFs to the transmission data symbols input from the header insertion units 205a and 205b (the transmission data symbols each having the header added thereto), respectively.

In step S306, the preamble insertion units 206a and 206b determine whether $i_{PPDU}=N_{PPDU}$. In the example illustrated in FIG. 1, $N_{PPDU}=3$. If $i_{PPDU}=N_{PPDU}$ (step S306: Yes), the preamble insertion units 206a and 206b determine that the PPDU is the last PPDU and end the preamble insertion process. However, if $i_{PPDU}\neq N_{PPDU}$ (step S306: No), the processing performed by the preamble insertion units 206a and 206b returns to step S301, and the preamble insertion units 206a and 206b repeat the preamble insertion process.

As described above, according to an existing non-legacy A-PPDU technique, the non-legacy STF and non-legacy CEF are transmitted by the first PPDU. Hereinafter, the case where the transmission apparatus 200 transmits a non-legacy A-PPDU by the MIMO method and where an MCS that differs from the MCS of the first PPDU is used for at least one of the second and the subsequent PPDUs is discussed in terms of the two points described below.

Point 1: To maximize the channel capacity, it is assumed that the transmission apparatus 200 changes the precoding matrix PPDU by PPDU in accordance with the MCS. In this case, the precoding matrix estimated by the reception apparatus through channel estimation using the legacy CEF of the first PPDU may differ from the precoding matrix used by the transmission apparatus 200 for each of the PPDUs. The difference in the precoding matrix may cause insufficient spatial separation and, thus, decreases the reception characteristics.

Point 2: To prevent the decrease in reception characteristics, it is assumed that a precoding matrix fixed within a non-legacy A-PPDU is used. In this case, it is difficult for the transmission apparatus 200 to maximize the channel capacity of each of the PPDUs and, thus, the transmission efficiency decreases.

To solve the above-described problems, the present disclosure has been made.

First Embodiment

A transmission apparatus 500 that supports the non-legacy A-PPDU scheme according to the first embodiment of the present disclosure inserts a non-legacy STF and a non-legacy CEF into a PPDU other than the first PPDU.

Figure 4A:
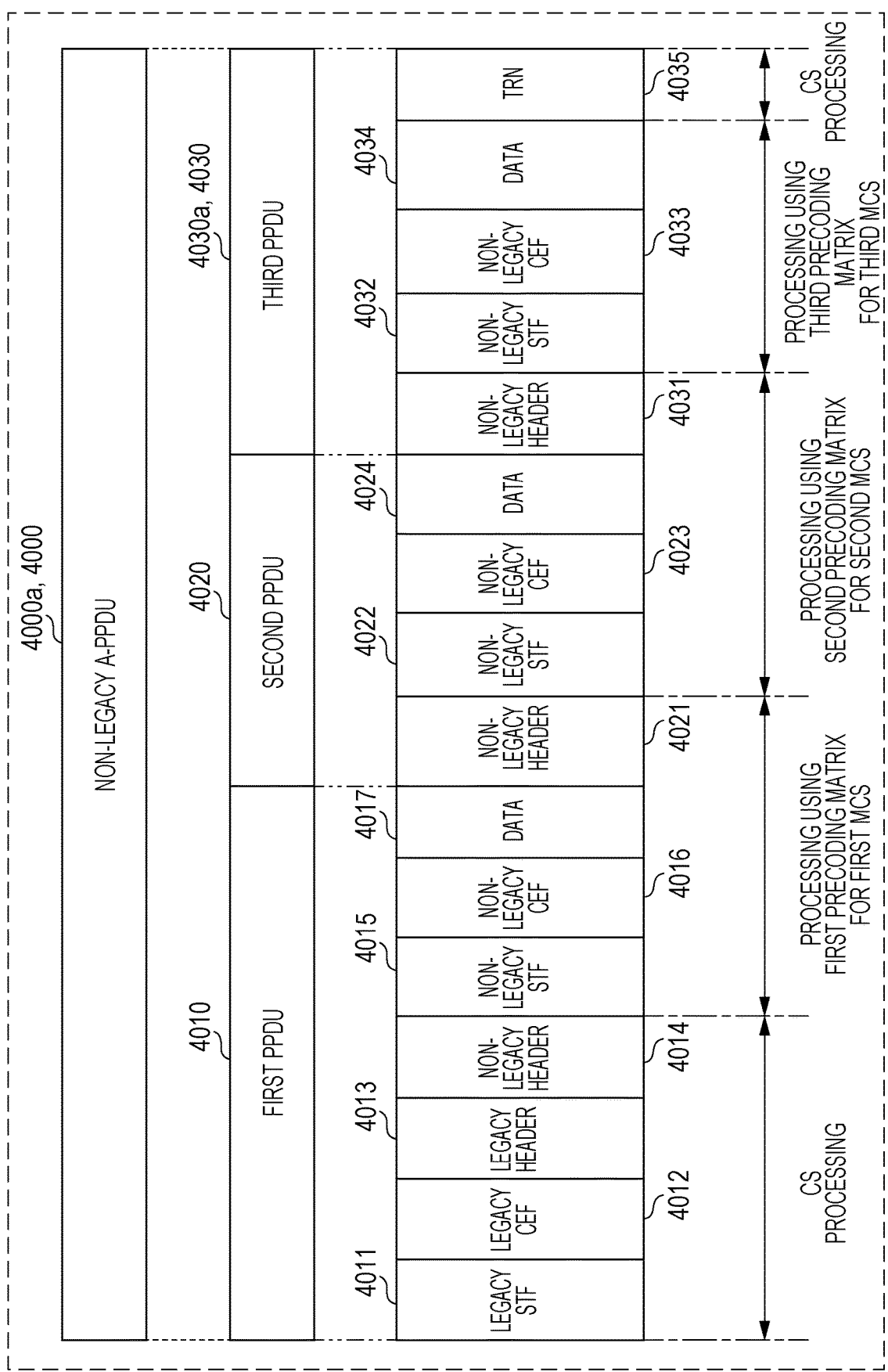
FIG. 4A is a diagram illustrating an example of a non-legacy A-PPDU format according to the present disclosure.

FIG. 4A is a diagram illustrating an example of the format of a non-legacy A-PPDU 4000a according to the first embodiment.

Figure 4B:
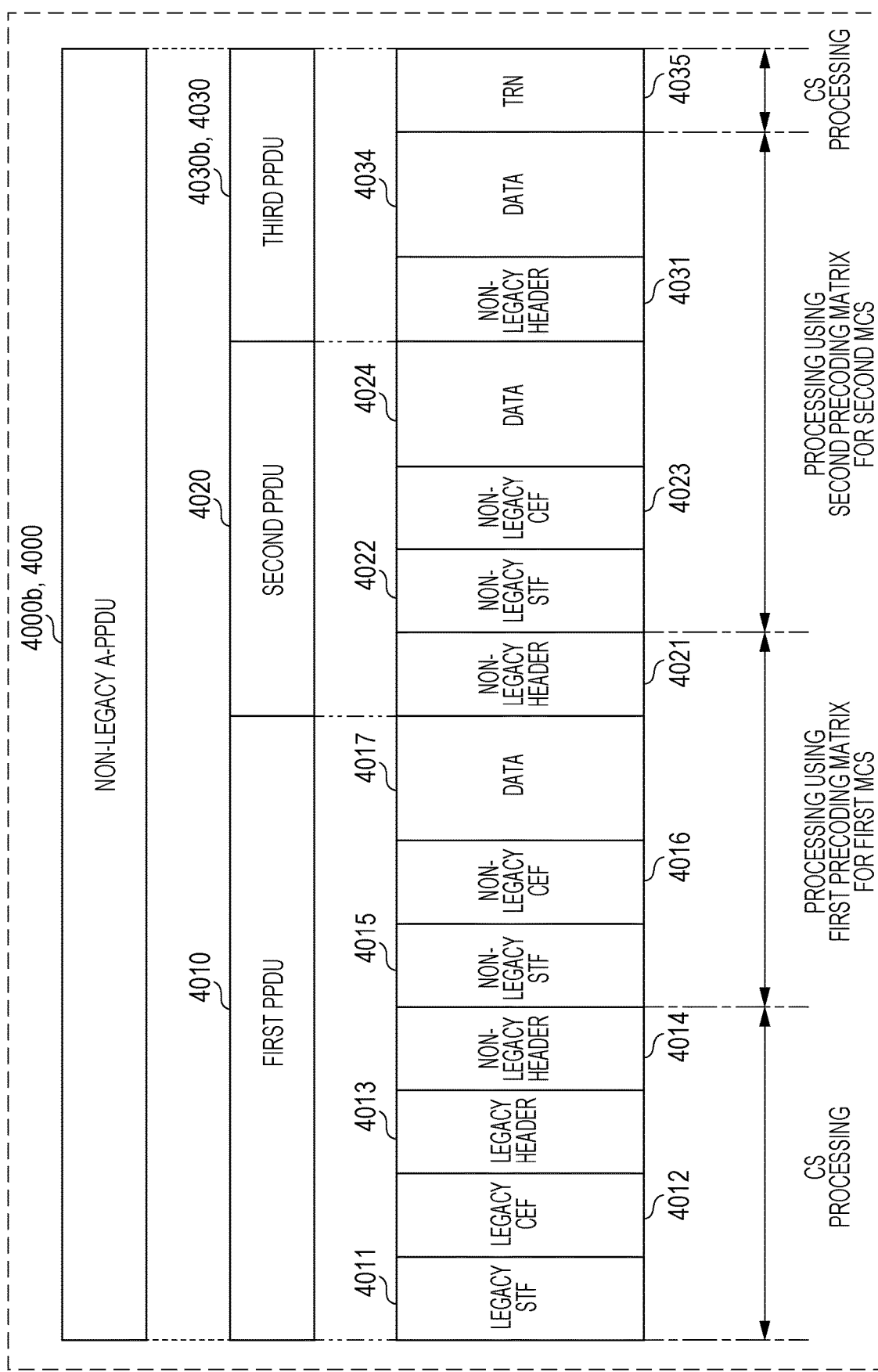
FIG. 4B is a diagram illustrating an example of a non-legacy A-PPDU format according to the present disclosure.

FIG. 4B is a diagram illustrating an example of the format of a non-legacy A-PPDU 4000b according to the first embodiment.

FIG. 4C is a diagram illustrating an example of the format of a non-legacy A-PPDU 4000c according to the first embodiment.

A non-legacy A-PPDU 4000 includes a first PPDU 4010, a second PPDU 4020, and a third PPDU 4030. Note that according to the first embodiment, the case where the number of aggregated PPDUs ($N_{PPDU}$) is 3 is illustrated and described. However, the number of aggregated PPDUs may be an integer number greater than or equal to 2.

The first PPDU 4010 includes a legacy STF 4011, a legacy CEF 4012, a legacy header field 4013, a non-legacy header field 4014, a non-legacy STF 4015, a non-legacy CEF 4016, and a data field 4017.

The second PPDU 4020 includes a non-legacy header field 4021, a non-legacy CEF 4023, and a data field 4024. In one example, the second PPDU 4020 further includes a non-legacy STF 4022 and a non-legacy CEF 4023. In another example, the second PPDU 4020 does not include the non-legacy STF 4022 and the non-legacy CEF 4023.

The third PPDU 4030 includes a non-legacy header field 4031, a data field 4034, and a TRN field 4035. In one example, the third PPDU 4030 further includes a non-legacy STF 4032 and a non-legacy CEF 4033 (a third PPDU 4030a). In another example, the third PPDU 4030 does not include the non-legacy STF 4032 and the non-legacy CEF 4033 (a third PPDU 4030b or 4030c).

Figure 5:
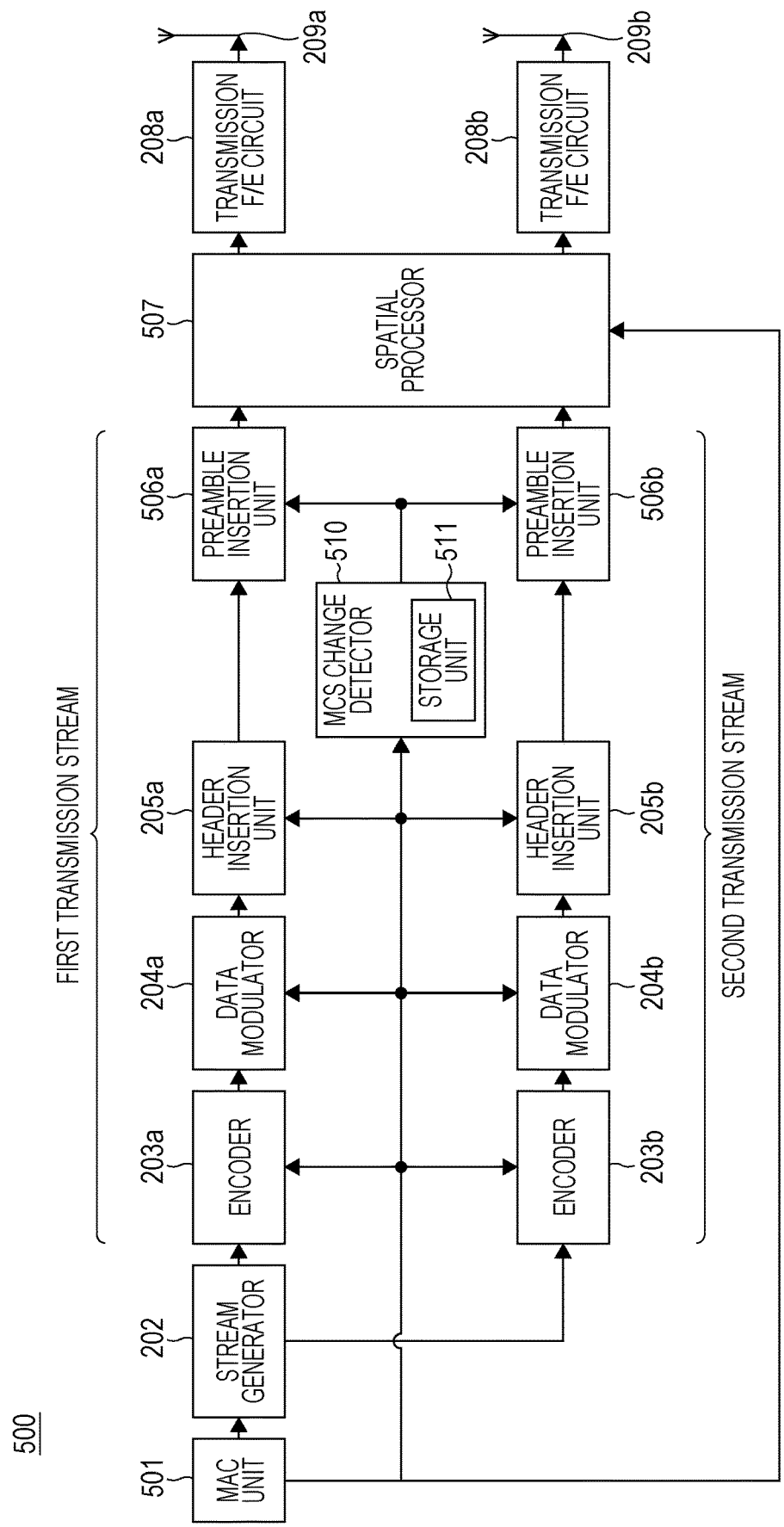
FIG. 5 is a diagram illustrating an example of the configuration of a transmission apparatus according to the present disclosure.

FIG. 5 is a diagram illustrating an example of the configuration of the transmission apparatus 500 according to the first embodiment.

The transmission apparatus 500 includes a MAC unit 501, a stream generator 202, encoders 203a and 203b, data modulators 204a and 204b, header insertion units 205a and 205b, preamble insertion units 506a and 506b, a spatial processor 507, transmission F/E circuits 208a and 208b, transmitting antennas 209a and 209b, and an MCS change detector 510. Among these constituent elements, the stream generator 202, the encoders 203a and 203b, the data modulators 204a and 205b, the header insertion units 205a and 205b, the transmission F/E circuits 208a and 208b, and the transmitting antennas 209a and 209b are the same as those described above with reference to FIG. 2. Thus, description of the constituent elements is not repeated. Note that in the following description, the notation "XYZ unit" used for a constituent element of the transmission apparatus 500 may be replaced by another notation, such as "XYZ circuit (circuitry)", "XYZ apparatus", or "XYZ module".

The MAC unit 501, the stream generator 202, the encoders 203a and 203b, the data modulators 204a and 204b, and the header insertion units 205a and 205b function as a generation circuit for generating a transmission signal formed by aggregating a plurality of protocol data units in the physical layer. In addition, the preamble insertion units 506a and 506b function as an insertion circuit for inserting a preamble used for at least one of synchronization of transmission channels and estimation of a transmission channel into the first protocol data unit and the second protocol data unit among the plurality of protocol data units. Furthermore, the spatial processor 507, the transmission F/E circuits 208a and 208b, and the transmitting antennas 209a and 209b function as a transmission circuit that performs spatial processing and transmits a transmission signal with the preamble inserted. Each of the constituent elements that provide these functions is described below.

The MAC unit 501 provides the same function as the MAC unit 201 described above with reference to FIG. 2. The MAC unit 501 further outputs the determined code rate of each of streams and the modulation scheme of each of the streams to the MCS change detector 510.

The MCS change detector 510 detects a change in MCS between two consecutive PPDUs on the basis of the code rate of each of the streams and the modulation scheme of each of the streams.

For example, when the first MCS is used in the first PPDU 4010 and the second MCS different from the first MCS is used in the second PPDU 4020, the MCS change detector 510 detects a change in MCS between the first PPDU 4010 and the second PPDU 4020. In addition, when the second MCS is used in the second PPDU 4020 and the second MCS is used in the third PPDU 4030, the MCS change detector 510 does not detect a change between the second PPDU 4020 and the third PPDU 4030. For example, the MCS change detector 510 may detect a change in MCS between two consecutive PPDUs on the basis of the values set in the non-legacy MCS fields of the non-legacy header generated by the header insertion units 205a and 205b. In addition, in one example, the MCS change detector 510 includes a storage unit 511 that stores information regarding the MCS already used in one non-legacy A-PPDU 4000.

Subsequently, the MCS change detector 510 outputs the detection result of the MCS change to the preamble insertion units 506a and 506b.

The preamble insertion units 506a and 506b add preambles to the transmission data symbols that have headers added thereto and that are input from the header insertion units 205a and 205b on the basis of the detection result of the MCS change output from the MCS change detector 510. The preambles are, for example, a legacy STF, a legacy CEF, a non-legacy STF, and a non-legacy CEF, which are added in the order illustrated in FIGS. 4A to 4C.

More specifically, in the example illustrated in FIG. 4A, the preamble insertion units 506a and 506b add, to the data field 4017 of the first PPDU 4010 in the first position, the legacy STF 4011, legacy CEF 4012, non-legacy STF 4015, and non-legacy CEF 4016 regardless of the result of detection of a change in MCS output from the MCS change detector 510. In addition, the preamble insertion units 506a and 506b add, to the transmission data fields 4024 and 4034 of the second and the subsequent PPDUs, the non-legacy STF and non-legacy CEF if the MCS changes from the MCS of the previous PPDU.

For example, for the transmission data field 4024 of the second PPDU 4020 in the second position, if the MCS has changed from that of the first PPDU 4010 in the previous stage (for example, if the first MCS has changed from the first MCS to the second MCS), the preamble insertion units 506a and 506b add the non-legacy STF 4022 and non-legacy CEF 4023. Furthermore, for the transmission data field 4034 of the third PPDU 4030 in the third position, if for example, the MCS has changed from that of the second PPDU 4020 in the previous stage (for example, if the second MCS has changed from the second MCS to the third MCS, the preamble insertion units 506a and 506b add the non-legacy STF 4032 and the non-legacy CEF 4033.

In addition, as illustrated in FIG. 4B, if the first MCS is used in the first PPDU 4010 and the second MCS is used in the second PPDU 4020, the preamble insertion units 506a and 506b add, to the second PPDU 4020, the non-legacy STF 4022 and the non-legacy CEF 4023. Furthermore, if the second MCS is used in both the second PPDU 4020 and the third PPDU 4030, the preamble insertion units 506a and 506b do not add the non-legacy STF 4032 and the non-legacy CEF 4033 to the third PPDU 4030.

Subsequently, the preamble insertion units 506a and 506b output, to the spatial processor 507, the transmission data symbols with or without the preamble added thereto.

The spatial processor 507 performs spatial processing on the transmission data symbols with or without the preamble added thereto (the transmission data symbols input from the preamble insertion units 506a and 506b) to generate a spatially processed signal. In this case, the spatial processing is at least one of CSD processing and spatial multiplexing processing by matrix operation using a precoding matrix. One of CSD processing and spatial multiplexing is performed on each of the fields of the preamble, header, and transmission data.

For example, the spatial processor 507 performs CSD processing on the legacy STF 4011, the legacy CEF 4012, the legacy header field 4013, and the non-legacy header field 4014 of the first PPDU 4010 and the TRN field 4035 of the third PPDU 4030.

Furthermore, for example, the spatial processor 507 performs, as spatial processing, spatial multiplexing processing by matrix operation using a precoding matrix corresponding to the MCS of each of the PPDUs on the non-legacy STF 4015, the non-legacy CEF 4016, and the data field 4017 of the first PPDU 4010, the non-legacy header field 4021, the non-legacy STF 4022, the non-legacy CEF 4023, and the data field 4024 of the second PPDU 4020, and the non-legacy header field 4031, the non-legacy STF 4032, the non-legacy CEF 4033, and the data field 4034 of the third PPDU 4030.

For example, in the example illustrated in FIG. 4A, the first MCS is used for the first PPDU 4010, the second MCS is used for the second PPDU 4020, and the third MCS is used for the third PPDU 4030a. Note that the first MCS, the second MCS, and the third MCS differ from one other. Thus, the spatial processor 507 uses the first precoding matrix for the first PPDU 4010 and the non-legacy header field 4021 of the second PPDU 4020.

In addition, the spatial processor 507 uses a second precoding matrix that differs from the first precoding matrix for the second non-legacy STF 4022, the non-legacy CEF 4023, the transmission data field 4024 of the second PPDU 4020 and the non-legacy header field 4031 of the third PPDU 4030a. Furthermore, the spatial processor 507 uses a third precoding matrix that differs from each of the first precoding matrix and the second precoding matrix for the non-legacy STF 4032, the non-legacy CEF 4033, and the transmission data field 4034 of the third PPDU 4030a.

In addition, in the example illustrated in FIG. 4B, the first MCS is used for the first PPDU 4010, and the second MCS that differs from the first MCS is used for both the second PPDU 4020 and the third PPDU 4030b. Thus, the spatial processor 507 uses the first precoding matrix for the first PPDU 4010 and the non-legacy header field 4021 of the second PPDU 4020. Furthermore, the spatial processor 507 uses a second precoding matrix that differs from the first precoding matrix for the non-legacy STF 4022, the non-legacy CEF 4023, and the transmission data field 4024 of the second PPDU 4020 and the third PPDU 4030b.

Subsequently, the spatial processor 507 outputs the spatially processed signal to the transmission F/E circuits 208a and 208b.

Note that the reception apparatus estimates the precoding matrix by using the non-legacy CEF. For this reason, as illustrated in FIGS. 4A and 4B, the switching timing of the precoding matrix is set to a point after the non-legacy header field 4021 and a point after the non-legacy header field 4031, not a point after the data field 4017 and a point after the data field 4024. In accordance with this setting, the reception apparatus uses the precoding matrix of the previous PPDU for the non-legacy header located before the non-legacy CEF. In this manner, the non-legacy header is appropriately spatially separated.

Figure 6:
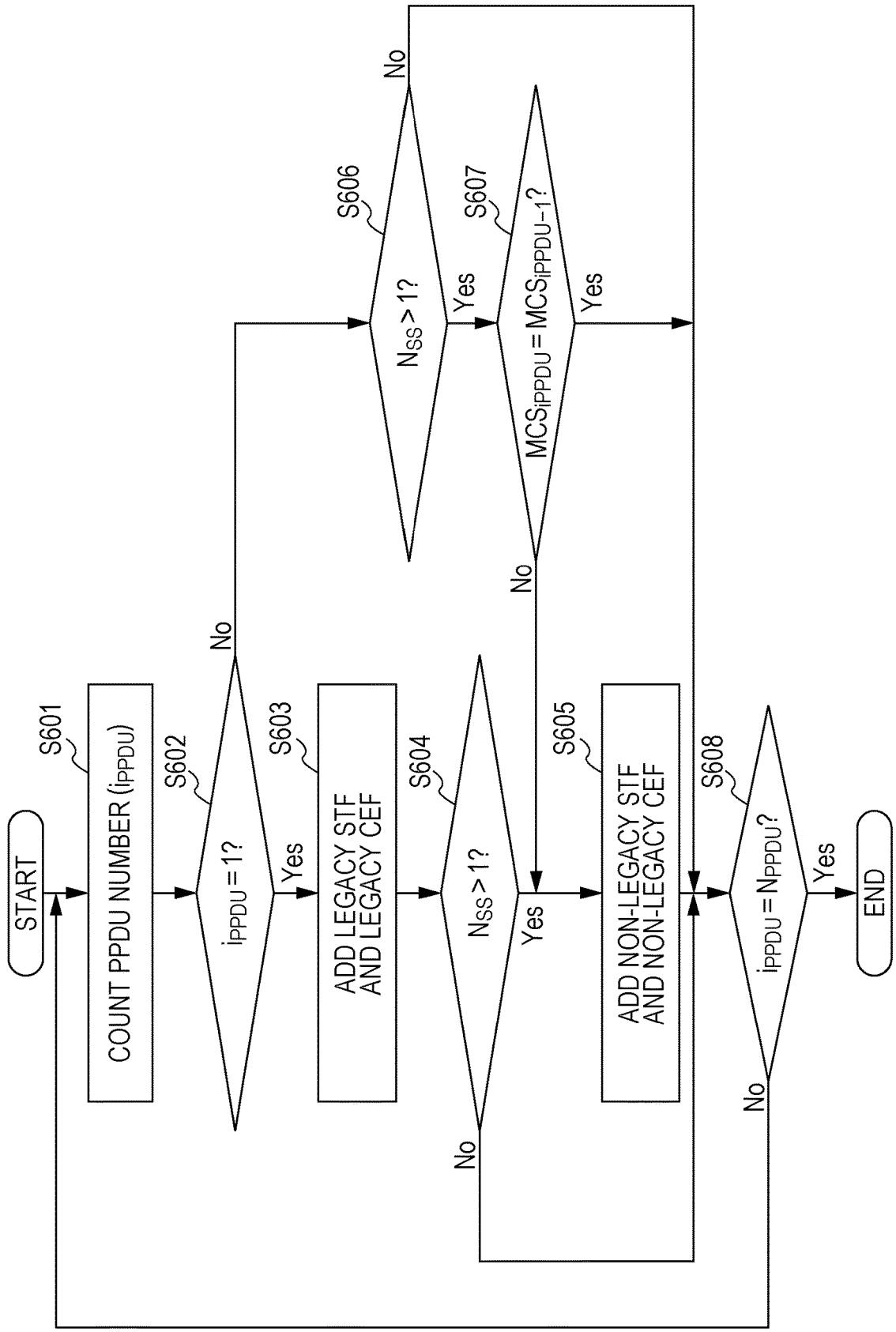
FIG. 6 is a flowchart illustrating a preamble insertion procedure according to the present disclosure.

FIG. 6 is a flowchart illustrating an example of a procedure in which the preamble insertion units 506a and 506b add the legacy STF, the legacy CEF, the non-legacy STF, and the non-legacy CEF to the transmission data symbols.

In step S601, the preamble insertion units 506a and 506b count the PPDU number $i_{PPDU}$ of a PPDU aggregated into the non-legacy A-PPDU 4000. For example, in the case of the first PPDU (the first PPDU 4010 in FIGS. 4A to 4C), $i_{PPDU}=1$. In the case of the second PPDU (the second PPDU 4020 in FIGS. 4A to 4C), $i_{PPDU}=2$. That is, in the case of the Nth PPDU, $i_{PPDU}=N$, where N is an integer number greater than or equal to 1.

In step S602, the preamble insertion units 506a and 506b determine whether the transmission data symbol that has the header added thereto and that is input from the header insertion units 505a and 505b is included in the first PPDU on the basis of the value of $i_{PPDU}$. If $i_{PPDU}=1$ (step S602: Yes), the preamble insertion units 506a and 506b determine that the transmission data symbol is included in the first PPDU, and the processing proceeds to step S603. However, if $i_{PPDU}\neq1$ (step S602: No), the preamble insertion units 506a and 506b determine that the transmission data symbol is not included in the first PPDU, and the processing proceeds to step S606.

Case of First PPDU ($i_{PPDU}=1$)

In step S603, the preamble insertion units 506a and 506b add the legacy STF and the legacy CEF to the transmission data symbols input from the header insertion units 205a and 205b (the transmission data symbols each having the header added thereto), respectively.

In step S604, the preamble insertion units 506a and 506b determine whether the non-legacy A-PPDU 4000 is to be transmitted by the MIMO method. For example, if the number of MIMO streams $N_{SS}$ is greater than 1, the preamble insertion units 506a and 506b determine that the non-legacy A-PPDU 4000 is to be transmitted by the MIMO method (step S604: Yes), and the processing proceeds to step S605. However, if the number of MIMO streams $N_{SS}$ is equal to 1, the preamble insertion units 506a and 506b determine that the non-legacy A-PPDU 4000 is to be transmitted by the SISO method (step S604: No), and the processing proceeds to step S608.

In one example, the preamble insertion units 506a and 506b use the number of MIMO streams $N_{SS}$ sent from the MAC unit 501 for determination. In another example, the preamble insertion units 506a and 506b use the MIMO stream number $N_{SS}$ read from the number-of-MIMO streams field of the non-legacy header for determination.

In step S605, the preamble insertion units 506a and 506b add the non-legacy STF and the non-legacy CEF to the transmission data symbols.

Case of Second and Subsequent PPDUs ($i_{PPDU}\neq1$)

In step S606, the preamble insertion units 506a and 506b determine whether the non-legacy A-PPDU 4000 is to be transmitted by the MIMO method. The processing performed in step S606 is the same as the processing performed in step S604 described above.

In step S607, the preamble insertion units 506a and 506b detect a change in MCS that occurs between two consecutive PPDUs. If $MCSi_{PPDU}=MCSi_{PPDU-1}$ (step S607: Yes), the preamble insertion units 506a and 506b determine that the MCS has not changed, and the processing proceeds to step S608. Note that $MCS_N$ represents the MCS of the Nth PPDU for the integer number N greater than or equal to 2. However, if $MCSi_{PPDU}\neq MCSi_{PPDU-1}$ (step S607: No), the preamble insertion units 506a and 506b determine that the MCS has changed, and the processing proceeds to step S605.

If the MCS changes between two consecutive PPDUs, the preamble insertion units 506a and 506b add the non-legacy STF and the non-legacy CEF to the transmission data symbol in step S605. That is, if the MCS changes between the (N−1)th PPDU and the Nth PPDU, the preamble insertion units 506a and 506b add the non-legacy STF and the non-legacy CEF to the transmission data symbol of the Nth PPDU.

The preamble insertion units 506a and 506b repeat steps S601 to S607 until the last PPDU is reached. That is, if in step S608, $i_{PPDU}=N_{PPDU}$ ($N_{PPDU}=3$ in FIG. 4A) (step S608: Yes), the preamble insertion units 506a and 506b determine that the last PPDU is reached and end the flow. However, if $i_{PPDU}<N_{PPDU}$ (No in step S608), the processing performed by the preamble insertion units 506a and 506b returns to step S601.

In one example, the MCS change detector 510 may detect whether the MCS used is the first MCS used within one non-legacy A-PPDU. For example, if the information regarding the MCS to be used is not stored in the storage unit 511, the MCS change detector 510 detects that the MCS is a MCS used for the first time for one non-legacy A-PPDU.

In this case, the preamble insertion units 506a and 506b add the non-legacy STF and the non-legacy CEF to the PPDU using the MCS that is used for the first time for the non-legacy A-PPDU. However, the preamble insertion units 506a and 506b do not add the non-legacy STF and the non-legacy CEF to the PPDU using the MCS that is the same as the MCS used for the PPDU in the previous stage.

For example, in FIG. 4A, a first MCS is used in the first PPDU, a second MCS that differs from the first MCS is used in the second PPDU, and a third MCS that differs from the first and second MCSs is used in the third PPDU. Accordingly, the preamble insertion units 506a and 506b add the non-legacy STF and the non-legacy CEF to each of the first PPDU, the second PPDU, and the third PPDU.

In FIG. 4C, the first MCS is used in the first PPDU and the third PPDU, and the second MCS is used in the second PPDU. Accordingly, the preamble insertion units 506a and 506b add the non-legacy STF and the non-legacy CEF to each of the first PPDU and the second PPDU. However, the preamble insertion units 506a and 506b do not add the non-legacy STF and the non-legacy CEF to the third PPDU.

Note that a reception apparatus (not illustrated) that receives the non-legacy A-PPDU illustrated in FIG. 4C performs channel estimation by using the non-legacy CEF for a PPDU that uses the MCS that is used for the first time in one non-legacy A-PPDU. However, the reception apparatus uses the result of already performed channel estimation for a PPDU that uses an MCS the same as the MCS already used in one non-legacy A-PPDU. In this manner, the backoff caused by the non-legacy STF and the non-legacy CEF can be minimized.

Note that the preamble insertion units 506a and 506b may insert the non-legacy STF and the non-legacy CEF into each of all the PPDUs regardless of the detection result of the MCS change output from the MCS change detector 510. In this way, the MCS change detector 510 that determines the switching of the spatial processing can be removed from the circuits constituting the transmission apparatus 500 and, thus, the preamble insertion units 506a and 506b that operate on the basis of the result output from the MCS change detector 510 can be simplified. As a result, the circuit scale of the transmission apparatus 500 can be reduced.

Figure 7:
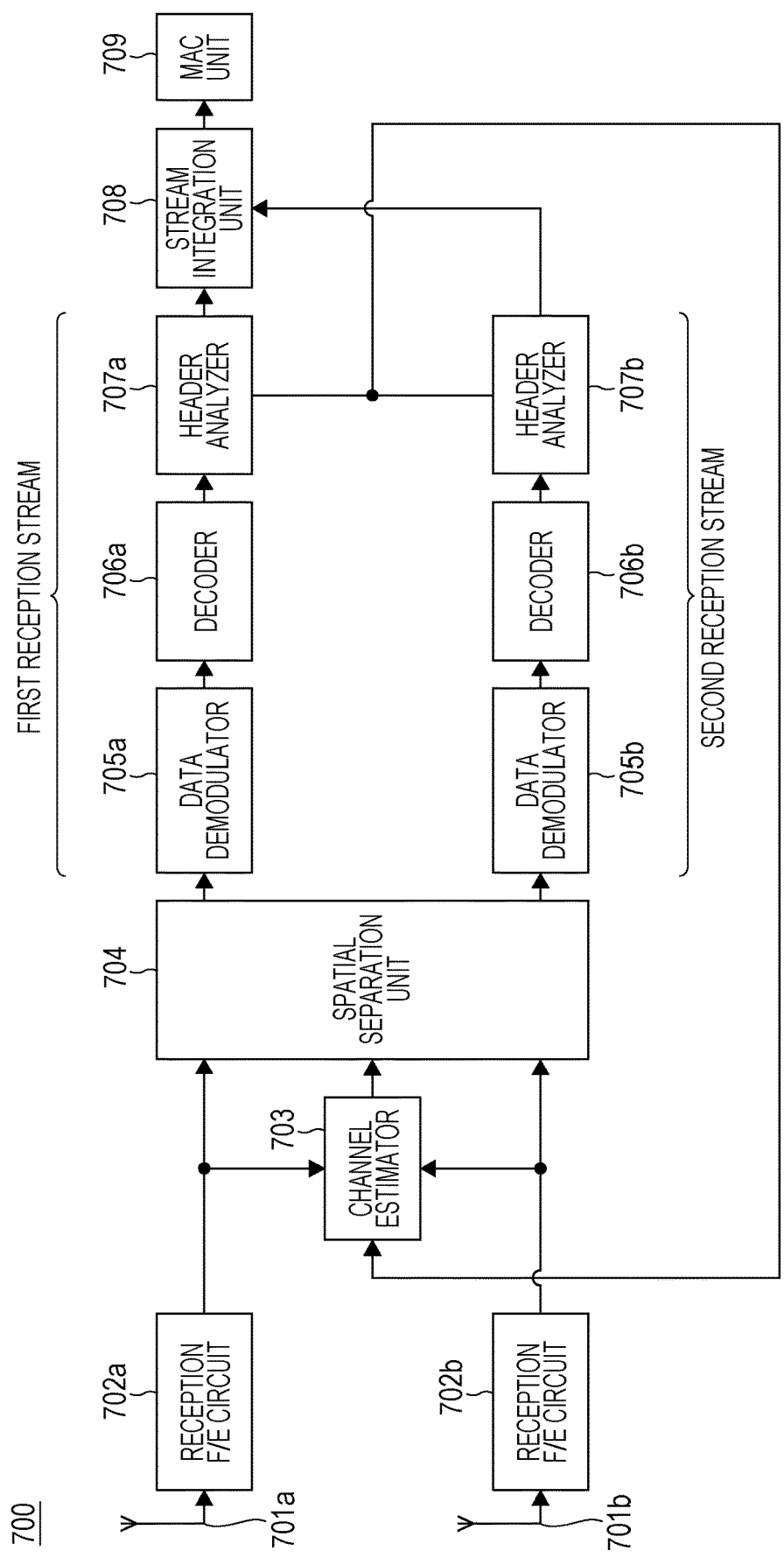
FIG. 7 is a diagram illustrating an example of the configuration of a reception apparatus according to the present disclosure.

FIG. 7 is a diagram illustrating an example of the configuration of a reception apparatus 700 that supports the non-legacy A-PPDU scheme according to the first embodiment.

The reception apparatus 700 includes receiving antennas 701a and 701b, reception F/E circuits 702a and 702b, a channel estimator 703, a spatial separation unit 704, data demodulators 705a and 705b, decoders 706a and 706b, header analyzers 707a and 707b, a stream integration unit 708, and a MAC unit 709.

The receiving antennas 701a and 701b, the reception F/E circuits 702a and 702b, the channel estimator 703, and the spatial separation unit 704 function as a reception circuit that receives a signal and performs spatial separation. The data demodulators 705a and 705b function as a demodulation circuit that demodulates the spatially separated signal. Note that in the following description, the notation "XYZ unit" used for a constituent element of the reception apparatus 700 may be replaced by another notation, such as "XYZ circuit (circuitry)", "XYZ apparatus", or "XYZ module".

The reception apparatus 700 receives a transmission signal transmitted from the transmission apparatus 500 via the receiving antennas 701a and 701b, and the reception F/E circuits 702a and 702b perform amplification, frequency conversion, an anti-aliasing filter process, and an A/D (analog/digital) conversion process on the reception signal.

The channel estimator 703 estimates the frequency characteristics of the transmission channel and the precoding matrix used by the transmission apparatus 500 by using the non-legacy CEF of the received signal.

The spatial separation unit 704 separates (spatially separates) the received signal subjected to either CSD processing or spatial multiplexing processing on the basis of the result of channel estimation and generates first reception stream data and second reception stream data. Thereafter, the spatial separation unit 704 outputs the first reception stream data and the second reception stream data to the data demodulators 705a and 705b, respectively.

The data demodulator 705a performs a demodulation process and an LLR (Log-Likelihood Ratio) calculation process on the first reception stream data. Similarly, the data demodulator 705b performs a demodulation process and an LLR calculation process on the second reception stream data.

The decoder 706a performs an error correction process on the demodulated first reception stream data and outputs the error-corrected reception stream data to the header analyzer 707a. Similarly, the decoder 706b performs an error correction process on the demodulated second reception stream data and outputs the error-corrected reception stream data to the header analyzer 707b.

The header analyzers 707a and 707b analyze the non-legacy headers of the error-corrected first reception stream data and second reception stream data, respectively, and acquire the information, such as the MCS and the number of MIMO streams $N_{SS}$. The reception apparatus 700 can get to know whether a non-legacy STF and a non-legacy CEF are present in each of the PPDUs by determining whether the $N_{SS}$ is greater than 1 or whether the MCS has changed from that of the previous PPDU.

The stream integration unit 708 integrates the first reception stream data and the second reception stream data into one stream data and outputs the integrated stream data to the MAC unit 709.

The MAC unit 709 extracts the transmission data generated by the transmission apparatus 200 from the integrated stream data.

As described above, according to the first embodiment, to configure and transmit an aggregate-PPDU (Physical Layer Convergence Protocol Data Unit), the precoding matrix is changed PPDU by PPDU in accordance with the MCS. In this manner, the channel capacity can be maximized, and a decrease in transmission efficiency can be prevented. Furthermore, since the reception apparatus can estimate the precoding matrix used by the transmission apparatus 200 for each of the PPDUs, sufficient spatial separation and reception characteristics can be ensured.

The first embodiment is applicable to a wireless communication system that configures and transmits an aggregate-PPDU (physical layer convergence protocol data unit). Examples of a wireless communication system include a cellular phone, a smartphone, a tablet terminal, and a television set that transmit and receive moving images (videos), still images (pictures), text data, audio data, and control data.

While various embodiments have been described above with reference to the accompanying drawings, it is to be understood that the present disclosure is not limited to such examples. Further changes and modifications will be obvious to those skilled in the art within the scope of attached claims, and the changes and modifications are encompassed by the technical scope of the present disclosure. In addition, the constituent elements of the above-described embodiments may be combined in any way within the spirit or scope of the present disclosure.

While each of the above embodiments has been described above with reference to the configuration using hardware, the present disclosure can also be implemented by software in cooperation with hardware.

In addition, each of the functional blocks used in the description of the above embodiments is typically implemented as an LSI, which is an integrated circuit having an input terminal and an output terminal. The functional blocks may be formed as individual chips, or some or all of the functional blocks may be integrated into a single chip. The term "LSI" is used herein, but the term "IC", "system LSI", "super LSI" or "ultra LSI" may be used as well depending on the level of integration.

In addition, the circuit integration is not limited to LSI and may be achieved by dedicated circuitry or a general-purpose processor. An FPGA (Field Programmable Gate Array), which is programmable after fabrication of the LSI, or a reconfigurable processor which allows reconfiguration of connections and settings of circuit cells in LSI may be used.

Moreover, should a circuit integration technology replacing LSI appear as a result of advancements in semiconductor technology or other technologies derived from the technology, the functional blocks could be integrated using such a technology. Another possibility is the application of biotechnology, for example.

According to the present disclosure, a transmission apparatus includes a generation circuit that generates a transmission signal in which a plurality of protocol data units in a physical layer are aggregated, an insertion circuit that inserts a preamble into each of a first protocol data unit and a second protocol data unit among the plurality of protocol data units, where the preamble is used for at least one of synchronization of a transmission channel and estimation of the transmission channel, and a transmission circuit that performs spatial processing on the transmission signal with the preamble inserted and transmits the transmission signal.

According to the transmission apparatus of the present disclosure, the spatial processing is at least one of a cyclic shift delay process and a spatial multiplexing process using a precoding matrix.

According to the transmission apparatus of the present disclosure, the preamble includes at least one of a non-legacy CEF (Channel Estimation Field) and a non-legacy STF (Short Training Field).

According to the transmission apparatus of the present disclosure, the insertion circuit inserts the preamble into all of the plurality of protocol data units.

According to the present disclosure, the transmission apparatus further includes an MCS change detection circuit that detects a change in modulation and coding scheme (MCS) between two consecutive protocol data units on a basis of the code rates and the data modulation schemes of the plurality of protocol data units, and the insertion circuit determines whether to insert the preamble into the latter of the two consecutive protocol data units on a basis of the detected change.

According to the transmission apparatus of the present disclosure, if the number of MIMO (Multiple-Input and Multiple-Output) streams to be used is greater than 1 and if the change is detected, the insertion circuit inserts the preamble into the latter.

According to the transmission apparatus of the present disclosure, if the number of MIMO streams to be used is greater than 1 and if the change is not detected, the insertion circuit does not insert the preamble into the latter.

According to the transmission apparatus of the present disclosure, if the number of MIMO streams to be used is 1, the insertion circuit does not insert the preamble into the latter.

According to the present disclosure, a transmission method includes generating a transmission signal in which a plurality of protocol data units in a physical layer are aggregated, inserting a preamble into each of a first protocol data unit and a second protocol data unit among the plurality of protocol data units, where the preamble is used for at least one of synchronization of a transmission channel and estimation of the transmission channel, and performing spatial processing on the transmission signal with the preamble inserted and transmitting the transmission signal.

According to the present disclosure, a reception apparatus includes a reception circuit that receives a signal and spatially separates the signal, a demodulation circuit that demodulates the spatially separated signals, and a decoding circuit that decodes the demodulated signal. The spatially separated signal includes a plurality of aggregated protocol data units in a physical layer, each of a first protocol data unit and a second protocol data unit among the plurality of protocol data units has a preamble inserted thereinto, and the preamble is used for at least one of at least one of synchronization of a transmission channel and estimation of the transmission channel.

According to the reception apparatus of the present disclosure, the spatial separation includes spatial separation of one part of the received signal on a basis of the preamble inserted into the first protocol data unit and spatial separation of the other part of the received signal on a basis of the preamble inserted into the second protocol data unit.

According to the present disclosure, a reception method includes receiving a signal and spatially separating the signal, demodulating the spatially separated signals, and decoding the demodulated signals. The spatially separated signal includes a plurality of aggregated protocol data units in a physical layer, each of a first protocol data unit and a second protocol data unit among the plurality of protocol data units has a preamble inserted thereinto, and the preamble is used for at least one of synchronization of a transmission channel and estimation of the transmission channel.

According to the reception method of the present disclosure, the spatial separation includes spatial separation of one part of the received signal on a basis of the preamble inserted into the first protocol data unit and spatial separation of the other part of the received signal on a basis of the preamble inserted into the second protocol data unit.

The present disclosure is applicable to a wireless communication system that configures and transmits an A-PPDU (Aggregated Physical Layer Convergence Protocol Data Unit).

What is claimed is:

1. A transmission apparatus comprising:
   a generation circuit that generates a transmission signal in which a plurality of protocol data units in a physical layer are aggregated;
   a detection circuit that detects a change in a modulation and coding scheme (MCS) between two consecutive protocol data units within the plurality of protocol data units;
   an insertion circuit that inserts a preamble into the latter of the two consecutive protocol data units if a number of MIMO (Multiple-Input and Multiple-Output) streams is greater than 1 and the change in the MCS is detected, and skips the insertion of the preamble if the number of MIMO streams is equal to 1 or the change in the MCS is not detected, the preamble being used for at least one of synchronization of a transmission channel and estimation of the transmission channel; and
   a transmission circuit that performs spatial processing on the transmission signal with the preamble inserted and transmits the transmission signal.

2. The transmission apparatus according to claim 1, wherein the spatial processing is at least one of a cyclic shift delay process and a spatial multiplexing process using a precoding matrix.

3. The transmission apparatus according to claim 1, wherein the preamble includes at least one of a non-legacy CEF (Channel Estimation Field) and a non-legacy STF (Short Training Field).

4. The transmission apparatus according to claim 1, wherein the insertion circuit inserts the preamble into all of the plurality of protocol data units.

5. The transmission apparatus according to claim 1, wherein if the number of MIMO streams is greater than 1 and if the change is not detected, the insertion circuit does not insert the preamble into the latter.

6. The transmission apparatus according to claim 1, wherein if the number of MIMO streams is 1, the insertion circuit does not insert the preamble into the latter.

7. A transmission method comprising:
generating a transmission signal in which a plurality of protocol data units in a physical layer are aggregated;
detecting a change in a modulation and coding scheme (MCS) between two consecutive protocol data units among the plurality of protocol data units;
inserting a preamble into the latter of the two consecutive protocol data units if a number of MIMO (Multiple-Input and Multiple-Output) streams is greater than 1 and the change in the MCS is detected, and skips the insertion of the preamble if the number of MIMO streams is equal to 1 or the change in the MCS is not detected, the preamble being used for at least one of synchronization of a transmission channel and estimation of the transmission channel; and
performing spatial processing on the transmission signal with the preamble inserted thereinto and transmitting the transmission signal.

8. A reception apparatus comprising:
a reception circuit that receives a signal and spatially separates the signal;
a demodulation circuit that demodulates the spatially separated signals; and
a decoding circuit that decodes the demodulated signals,
wherein the spatially separated signal includes a plurality of aggregated protocol data units in a physical layer, wherein a preamble is inserted by a transmission apparatus into the latter of two consecutive protocol data units if a number of MIMO (Multiple-Input and Multiple-Output) streams is greater than 1 and a change in the MCS is detected between the two consecutive protocol data units, and wherein the insertion of the preamble is skipped if the number of MIMO streams is equal to 1 or the change in the MCS is not detected between the two consecutive protocol data units, and the preamble is used for at least one of at least one of synchronization of a transmission channel and estimation of the transmission channel.

9. The reception apparatus according to claim 8, wherein the spatial separation includes spatial separation of one part of the received signal on a basis of the preamble inserted into the first protocol data unit and spatial separation of the other part of the received signal on a basis of the preamble inserted into the second protocol data unit.

10. A reception method comprising:
receiving a signal and spatially separating the signal;
demodulating the spatially separated signals; and
decoding the demodulated signals,
wherein the spatially separated signal includes a plurality of aggregated protocol data units in a physical layer, wherein a preamble is inserted by a transmission apparatus into the latter of two consecutive protocol data units if a number of MIMO (Multiple-Input and Multiple-Output) streams is greater than 1 and a change in the MCS is detected between the two consecutive protocol data units, and wherein the insertion of the preamble is skipped if the number of MIMO streams is equal to 1 or the change in the MCS is not detected between the two consecutive protocol data units, and the preamble is used for at least one of synchronization of a transmission channel and estimation of the transmission channel.

11. The reception method according to claim 10, wherein the spatial separation includes spatial separation of one part of the received signal on a basis of the preamble inserted into the first protocol data unit and spatial separation of the other part of the received signal on a basis of the preamble inserted into the second protocol data unit.

* * * * *